(12) United States Patent
Mori et al.

(10) Patent No.: US 8,714,183 B2
(45) Date of Patent: May 6, 2014

(54) SYSTEM FOR HYDROGEN CHARGING

(75) Inventors: Daigoro Mori, Mishima (JP); Kenji Komiya, Numazu (JP); Kumiko Nishizawa, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 7 days.

(21) Appl. No.: 13/574,007

(22) PCT Filed: May 6, 2010

(86) PCT No.: PCT/JP2010/057758
§ 371 (c)(1),
(2), (4) Date: Jul. 19, 2012

(87) PCT Pub. No.: WO2011/138826
PCT Pub. Date: Nov. 10, 2011

(65) Prior Publication Data
US 2012/0291902 A1  Nov. 22, 2012

(51) Int. Cl.
*F17D 1/00* (2006.01)
(52) U.S. Cl.
USPC .......................................... 137/256; 137/266
(58) Field of Classification Search
USPC .......................................... 137/256, 266, 263
See application file for complete search history.

(56) References Cited

U.S. PATENT DOCUMENTS

| | | | | |
|---|---|---|---|---|
| 1,296,229 A | * | 3/1919 | Tampier | 137/266 |
| 2,549,409 A | * | 4/1951 | Atkinson | 137/113 |
| 5,615,702 A | * | 4/1997 | Dawans et al. | 137/255 |
| 6,070,610 A | * | 6/2000 | Owler | 137/624.2 |
| 6,206,027 B1 | * | 3/2001 | Ponnet et al. | 137/266 |
| 6,651,701 B2 | * | 11/2003 | Kuriiwa et al. | 141/4 |
| 6,708,718 B2 | * | 3/2004 | Yamada et al. | 137/255 |
| 7,337,794 B2 | * | 3/2008 | Brigham et al. | 137/1 |
| 7,624,753 B2 | * | 12/2009 | Suess et al. | 137/266 |
| 7,988,926 B2 | * | 8/2011 | Schmidt-Ihn et al. | 422/198 |
| 8,215,342 B2 | * | 7/2012 | McLean et al. | 141/11 |
| 2007/0215209 A1 | * | 9/2007 | Street et al. | 137/263 |

FOREIGN PATENT DOCUMENTS

| | | |
|---|---|---|
| CA | 2562003 A1 | 4/2007 |
| JP | 2001-355795 A | 12/2001 |
| JP | 2005-069327 A | 3/2005 |
| JP | 2005-155869 A | 6/2005 |
| JP | 2007-170443 A | 7/2007 |

OTHER PUBLICATIONS

International Search Report mailed Aug. 10, 2010 of PCT/JP2010/057758.

* cited by examiner

*Primary Examiner* — John Rivell
*Assistant Examiner* — Umashankar Venkatesan
(74) *Attorney, Agent, or Firm* — Kenyon & Kenyon LLP (57) ABSTRACT

A system for hydrogen charging has an orifice provided as a flow restrictor between a hydrogen charging port and a hydrogen tank having a larger heat flux value. No orifice is provided on the side of a hydrogen tank having a smaller heat flux value. The orifice has a function of increasing the channel resistance. With the above, it is possible to initially have the hydrogen tank having a smaller heat flux value in the fully charged state, and thereafter the hydrogen tank having a larger heat flux value in the fully charged state. Alternatively, a check valve having a cracking pressure $\Delta P_2$ can be provided as a flow restrictor on the side of the hydrogen tank having larger heat flux, and a check valve having a cracking pressure $\Delta P_1$ can be provided as a flow restrictor on the side of the hydrogen tank having smaller heat flux, wherein $\Delta P_2 > \Delta P_1$.

4 Claims, 5 Drawing Sheets

|  | TANK WITH SMALLER HEAT FLUX | TANK WITH LARGER HEAT FLUX |
|---|---|---|
| SURFACE AREA/VOLUME OF TANK | SMALL | LARGE |
| LINER MATERIAL | SMALLER HEAT CONDUCTIVE RATE | LARGER HEAT CONDUCTIVE RATE |
| MOUNT POSITION IN VEHICLE | DISADVANTAGEOUS POSITION FOR HEAT DISCHARGING | ADVANTAGEOUS POSITION FOR HEAT DISCHARGING |

FIG. 11

SYSTEM FOR HYDROGEN CHARGING

This is a 371 national phase application of PCT/JP2010/057758 filed 6 May 2010, the contents of which are incorporated herein by reference.

TECHNICAL FIELD

The present invention relates to a system for hydrogen charging, and in particular to a system for hydrogen charging for charging a plurality of hydrogen tanks with hydrogen gas from a hydrogen charging device.

BACKGROUND ART

A vehicle having a fuel cell that uses hydrogen gas as fuel gas causes a fuel tank to be charged with hydrogen gas, and runs while consuming the hydrogen gas. Thus, when the hydrogen gas in the hydrogen tank runs short, the vehicle needs to stop at a hydrogen supply station or the like to charge the hydrogen tank with hydrogen gas.

For example, Patent Document 1 describes that, as a hydrogen supply station, supply from a hydrogen supply tank is controlled based on the maximum working pressure of a vehicle-mounted hydrogen tank to be supplied hydrogen gas, using a tank specification determining means for determining the highest working pressure of a vehicle-mounted hydrogen tank. In the above, the shape of an earth adaptor for connection to an earth terminal provided to a vehicle differs from that of a vehicle-side earth terminal, depending on the highest working pressure of a vehicle-mounted hydrogen tank, and this is described as a tank specification determining means.

Patent Document 2 points out that, although mounting a plurality of tanks having different heat discharge characteristics on a vehicle is more efficient than mounting a single tank, in that respective characteristics can be utilized, it is not possible to carry out efficient charging when charging of the respective tanks begins at the same time, as the gas temperatures of the respective tanks increase by different amounts, and consequently, the tanks are non-uniform in gas charging efficiency. In view of the above, as a gas fuel charging method, it is described that charging pipes are connected to respective gas fuel charging ports of a plurality of tanks having different heat discharge characteristics, and that a charging channel switching means is provided to a vehicle so that gas fuel charging begins with a tank having a higher heat discharge characteristic.

RELATED ART DOCUMENTS

Patent Documents

Patent Document 1: Japanese Patent Laid-open Publication No. 2005-69327
Patent Document 2: Japanese Patent Laid-open Publication No. 2005-155869

DISCLOSURE OF INVENTION

Problem to be Solved by the Invention

As described in Patent Document 2, a plurality of hydrogen tanks having different shapes may be mounted to best utilize the mount space in a vehicle. In such a case, it is desirable that all tanks are placed in a uniformly charged state.

For hydrogen tanks having different shapes and/or materials, temperature may increase at different rates when charging the tanks with hydrogen. Thus, even though hydrogen gas is charged from one hydrogen charging device into two or more hydrogen tanks at the same pressure, different charge rates may be realized, as the density of the hydrogen gas differs with temperature despite the same charge pressure. For example, it may happen that, while one hydrogen tank is fully charged, another hydrogen tank is not. When there are tanks among a plurality of tanks that are not fully charged, the amount of fuel gas available to be used becomes smaller, and accordingly, the distance over which an electric vehicle can run becomes shorter. According to Patent Document 2, in such a case, the order of charging is determined with due consideration, using a charge channel switching means. This, however, results in a complicated device, and requires an extra charge time for switching.

An advantage of the present invention is to provide a system for charging hydrogen capable of uniform charging between a plurality of hydrogen tanks. Another advantage of the present invention is to provide a system for hydrogen charging capable of having a plurality of hydrogen tanks all in the fully charged state. The means described below contribute to achieving at least one of these advantages.

DISCLOSURE OF INVENTION

Means to Solve the Problem

A system for hydrogen charging according to the present invention comprises supply channels for connecting a hydrogen charging device and respective hydrogen tanks; and a flow restrictor for increasing a channel resistance of the supply channel connected to the hydrogen tank having larger heat flux to be larger than a channel resistance of the supply channel connected to the hydrogen tank having smaller heat flux or increasing a pressure loss of the supply channel connected to the hydrogen tank having larger heat flux to be larger than a pressure loss of the supply channel connected to the hydrogen tank having smaller heat flux.

In the system for hydrogen charging according to the present invention, preferably, the flow restrictor may be an orifice restrictor provided to the supply channel connected to the hydrogen tank having larger heat flux.

In the system for hydrogen charging according to the present invention, preferably, the flow restrictor may comprise check valves provided to the respective supply channels, and a cracking pressure of the check valve provided to the supply channel connected to the hydrogen tank having larger heat flux may be higher than a cracking pressure of the check valve provided to the supply channel connected to the hydrogen tank having smaller heat flux.

In the system for hydrogen charging according to the present invention, preferably, the plurality of hydrogen tanks may be fuel gas tanks mounted on a vehicle, and the hydrogen tank having larger heat flux may be a tank having a larger surface area per unit volume, a tank made of material having a larger heat conductive rate, or a tank mounted on a vehicle at a position more advantageous in ensuring larger heat flux, compared to the hydrogen tank having smaller heat flux.

Advantage of the Invention

With the above described structure, the system for hydrogen charging has a flow restrictor for increasing the channel resistance of the supply channel connected to the hydrogen tank having larger heat flux so as to be larger than that of the hydrogen tank having smaller heat flux or increasing a pressure loss of the supply channel connected to the hydrogen tank having larger heat flux so as to be larger than that of the hydrogen tank having smaller heat flux.

Although the internal tank temperature of the hydrogen tank increases as hydrogen charging proceeds, as the temperature of the hydrogen tank having larger heat flux increases by a smaller amount than that for the hydrogen tank having smaller heat flux, a higher charge rate is attained with the former than that with the latter when charging the tanks with hydrogen gas at the same pressure. According to the above described structure, when a larger channel resistance is set for the supply channel connected to the hydrogen tank having larger heat flux, the hydrogen tank having smaller heat flux is initially charged with hydrogen, and after the hydrogen tank having smaller heat flux is fully charged with hydrogen so that no more hydrogen is to be charged, the hydrogen tank having larger heat flux is then charged with hydrogen to an extent identical to that of the hydrogen tank having smaller heat flux. Consequently, when the charging is completed, both of the hydrogen tanks are left in the fully charged state. Meanwhile, when a larger pressure loss is set for the supply channel connected to the hydrogen tank having larger heat flux, the internal tank pressure of the hydrogen tank having larger heat flux can be made lower. This can make the charge rate of the hydrogen tank having larger heat flux identical to that of the hydrogen tank having smaller heat flux.

In the system for hydrogen charging, an orifice restrictor is provided to the supply channel connected to the hydrogen tank having larger heat flux. That is, using a simple structure as described above, it is possible to make larger the channel resistance of the supply channel connected to the hydrogen tank having larger heat flux.

In the system for hydrogen charging, a check valve having a higher cracking pressure is provided to the supply channel connected to the hydrogen tank having larger heat flux, and a check valve having a lower cracking pressure is provided to the supply channel connected to the hydrogen tank having smaller heat flux. A cracking pressure of a check valve refers to a pressure at which, after the pressure increases and the check valve accordingly begins to open, a predetermined constant amount of flow is established. That is, a high cracking pressure means a high pressure at which the check valve opens. That is, a check valve having a higher cracking pressure results in a larger pressure loss at the check valve. As described above, with adjustment of the cracking pressure of a check valve, it is possible to readily set a pressure loss of a supply channel connected to a hydrogen tank.

In the system for hydrogen charging, the plurality of hydrogen tanks are fuel gas tanks mounted on a vehicle, and a hydrogen tank having larger heat flux is a tank having a larger surface area per unit volume, a tank made of material having a higher heat conductive rate, or a tank mounted on a vehicle in a position that is advantageous in increasing the heat flux, as compared to a hydrogen tank having smaller heat flux. When two or more hydrogen tanks are mounted on a vehicle, as described above, there is caused a difference in the fuel flux between the plurality of hydrogen tanks due to a difference in the "surface area/volume," the material, or the mount position in a vehicle. When, in accordance with the difference, a hydrogen gas flow at higher temperature is supplied to a hydrogen tank having larger heat flux, and a hydrogen gas flow at lower temperature is supplied to a hydrogen tank having smaller heat flux, it is possible to uniformly charge the plurality of hydrogen tanks.

BEST MODE FOR CARRYING OUT THE INVENTION

In the following, an embodiment of the present invention will be described by reference to the drawings. In the following, a case of charging two hydrogen tanks having different shapes mounted on an electric vehicle with hydrogen gas will be described as a system for hydrogen charging. However, the present invention also encompasses a case in which a plurality of hydrogen tanks, including one not mounted on an electric vehicle, are charged with hydrogen gas from a hydrogen charging device. For example, a case including a plurality of fuel tanks of an installation type fuel cell is included. The number of hydrogen tanks may be three or more. The plurality of hydrogen tanks are not limited to those having different shapes, and any hydrogen tanks having different heat fluxes are applicable. A case in which the difference in the heat flux is attributed to amount or placement position of each hydrogen tank is also included.

Note that the temperature, pressure, and the like mentioned below are only for examples, and can be desirably changed depending on the specification of an electric vehicle, a use condition of a hydrogen tank, the specification of a hydrogen charging device, and the like.

In the following, like members are assigned like reference numerals throughout the drawings, with duplicated descriptions omitted. In the description, a reference numeral mentioned earlier is referred to when necessary.

Figure 1:
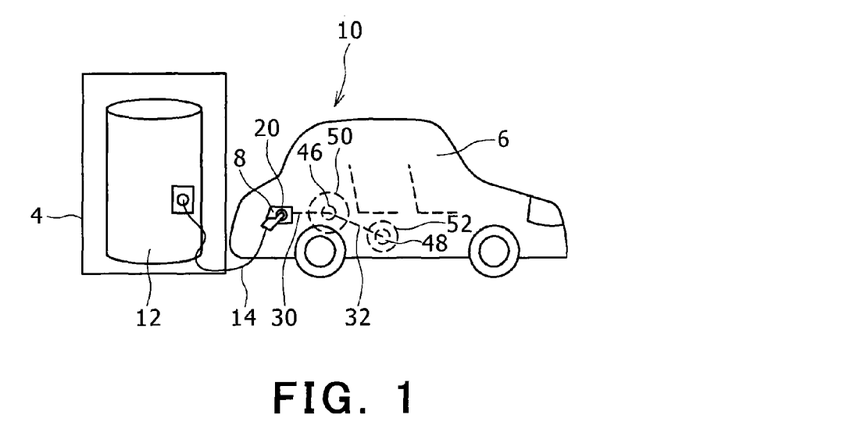
FIG. 1 is a diagram explaining charging two hydrogen tanks mounted in an electric vehicle with hydrogen, using a system for hydrogen charging according to an embodiment of the present invention.

FIG. 1 is a diagram explaining hydrogen charging from a hydrogen charging device 12 into two hydrogen tanks 50, 52 mounted on an electric vehicle 6, using a hydrogen charging system 10. In FIG. 1, a hydrogen supply station 4 where the hydrogen charging device 12 is installed and the electric vehicle 6 subjected to hydrogen charging are shown, although these are not included as structural components of the hydrogen charging system 10. FIG. 1 shows the electric vehicle 6 stopping by the hydrogen supply station 4 to be charged with hydrogen, and being charged with hydrogen.

The hydrogen supply station 4 provides a service of charging the electric vehicle 6 with hydrogen, and has the hydrogen charging device 12. The hydrogen supply station 4 is built in a place near a road by which a vehicle can stop, similar to a gas station.

The electric vehicle 6 is a vehicle having a fuel cell, not shown, mounted thereon. A fuel cell is a power supply device by supplying hydrogen gas, or fuel gas, and air, or oxidizing gas, to generate power through electrochemical reaction to obtain electric power, and the electric vehicle 6 is a vehicle that runs while driving a rotating electric device, using the electric power. As air is used as oxidizing gas, no oxygen tank or the like is necessary. However, as hydrogen gas is used as fuel gas, the electric vehicle 6 has hydrogen tanks mounted thereon into which hydrogen gas can be charged at high pressure.

A hydrogen charging part 8 is a recessed portion having a cap and formed on the rear lateral surface of the body of the electric vehicle 6. With the cap open, a receptacle, or a hydrogen charging port 20, is exposed. Into the receptacle, the charge end at the tip end of a hydrogen supply tube 14 pulled out from the hydrogen charging device 12 can be inserted in an airtight manner.

The hydrogen charging system 10 comprises a hydrogen charging device 12, the hydrogen supply tube 14, described above, the hydrogen charging port 20, hydrogen supply pipes 30, 32, plugs 46, 48, and hydrogen tanks 50, 52. Note that provision of a flow restrictor, to be described later, midway along a hydrogen supply channel from the hydrogen charging port 20 to the hydrogen tank is characteristic feature here. The flow restrictor is not shown in FIG. 1.

The hydrogen charging device 12 is provided to the hydrogen supply station 4, as described above, being a high-pressure, large capacity hydrogen tank. As one example, high pressure hydrogen gas at about 100 MPa is stored. Note that a hydrogen supply station 4 having a liquid hydrogen tank is also available, and in such a case, the liquid hydrogen is converted into high pressure hydrogen gas at such a pressure as mentioned above, using a carburetor, before being used in hydrogen charging service. In this case, the liquid hydrogen tank and the carburetor correspond to the hydrogen charging device 12. In order to achieve safe and reliable hydrogen charging, the hydrogen charging device 12 has a charge control unit for monitoring the pressure, temperature, and the like at the time of charging to control hydrogen supply.

The hydrogen supply tube 14 is a hydrogen introducing tube to be pulled out from the hydrogen charging device 12, as described above, and has a charging end at the tip end thereof. The charging end, together with the receptacle of the hydrogen charging port 20 of a vehicle, constitutes an assembly structure for preventing leakage of hydrogen gas. The hydrogen supply tube 14 has a detection structure for detecting normal completion, together with the receptacle, of the assembly structure, and a signal transmission structure for receiving a signal relating to pressure, temperature, and so forth from the hydrogen tanks 50, 52 and sending the same to the charge control unit of the hydrogen charging device 12.

The hydrogen charging port 20 is formed on a vehicle, as described above, and has a receptacle for accepting the charging end of the hydrogen charging device 12. Besides having a hydrogen supply hole, the receptacle, together with the charging end, constitutes an assembly structure for preventing leakage of hydrogen gas, as described above, and has a signal transmission structure for sending a signal relating to pressure, temperature, and so forth received from the hydrogen tanks 50, 52 to the charging end.

The hydrogen supply pipes 30, 32 are hydrogen introduction pipes extending from the hydrogen charging port 20 of a vehicle to two respective hydrogen tanks 50, 52. The hydrogen supply pipes 30, 32 are pipes of which one end is the single hydrogen charging port 20 and other ends are plugs 46, 48 provided to the connection members of the two respective hydrogen tanks 50, 52. That is, the hydrogen tanks 50, 52 have the respective hydrogen supply pipes 30, 32 in order to achieve simultaneous parallel hydrogen charging.

The plugs 46, 48 are gas inlets provided to the connection members of the hydrogen tanks 50, 52, as described above. Note that, besides the plugs 46, 48 for hydrogen charging, gas outlet plugs for supplying fuel gas to a fuel cell, not shown, and switching valves are provided to the connection members provided to the hydrogen tanks 50, 52. Further, a pressure gauge for measuring the internal tank pressure, a thermometer for measuring the internal tank temperature, and the like are also provided, as to be described later. Data measured by the pressure gauge and data measured by the thermometer are sent through a suitable signal line to the signal transmission structure of the hydrogen charging port 20.

The hydrogen tanks 50, 52 are high pressure fuel gas tanks mounted on a vehicle. Each of the hydrogen tanks 50, 52 has a column-like outer shape, and the outer circumference of the case, referred to as a liner, thereof is covered by a carbon fiber reinforced plastic to ensure sufficient strength to bear high pressure. The internal tank pressure is at, e.g., about 70 MPa. As material of the liner, a metallic member, such as aluminum or the like, a plastic member having an appropriate strength, or the like can be used. In the following, it is assumed that the hydrogen tanks 50, 52 both use an aluminum liner and have the same length but different outer diameters.

In the example shown in FIG. 1, a large hydrogen tank 50 having a larger outside diameter is placed near the rear trunk of the vehicle, and a small hydrogen tank 52 having a smaller outside diameter is placed near below the rear seat floor. The placement is such that the longitudinal direction of the column shape extends along the width direction of the vehicle.

Although not shown in FIG. 1, an orifice is provided as a flow restrictor midway on the channel from the hydrogen charging port 20 to the hydrogen tank 52 having larger heat flux, while no orifice is provided on the side of the hydrogen tank 50 having smaller heat flux. The orifice serving as a flow restrictor has a function of increasing the channel resistance. Specifically, the orifice here is a restricting device for restricting the flow of hydrogen gas being supplied from the hydrogen charging device 12 via the hydrogen charging port 20 to the hydrogen tank 52.

Alternatively, as flow restrictors, check valves having different cracking pressures may be provided midway along the respective channels from the hydrogen charging port 20 to the respective hydrogen tanks 50, 52. The cracking pressure of a check valve is a pressure at which, after the pressure increases and the check valve accordingly begins to open, a predetermined constant rate of flow is established. A pressure loss at a check valve consequently differs, depending on the cracking pressure. It is determined here that a check valve having a larger cracking pressure and a larger pressure loss is provided on the side of the hydrogen tank 52 having larger heat flux, while a check valve having a smaller cracking pressure and a smaller pressure loss is provided on the side of the hydrogen tank 50 having smaller heat flux.

Figure 2:
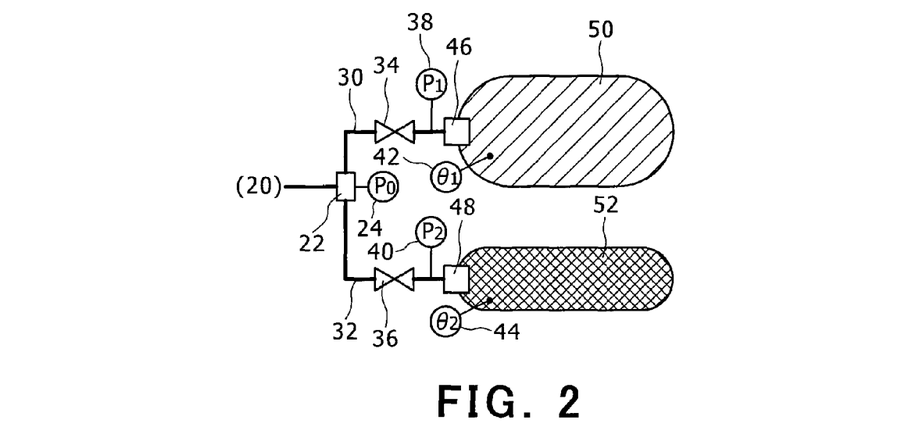
FIG. 2 is a diagram explaining a conventional system for hydrogen charging for comparison.

To describe the content of the flow restrictor, comparison with the content of conventional hydrogen charging will suffice. A case using a conventional hydrogen charging method in the structure shown in FIG. 1 will be initially described, followed by a detailed description on the hydrogen charging system 10 using a separating mechanism such as an orifice or check valves. FIG. 2 is a diagram showing components, mounted in a vehicle, of the hydrogen charging system 10 with no separating mechanism provided.

In FIG. 2, a branch 22 is a member for branching a pipe from the hydrogen charging port 20 into hydrogen supply pipes 30, 32 of the respective hydrogen tanks 50, 52, and a T-shaped coupler can be used as the branch 22. A pressure gauge 24 is a pressure measuring means for measuring the pressure of hydrogen gas supplied from the hydrogen charging port 20.

On-off valves 34, 36 are on-off valves provided halfway along the respective gas channels that connect the hydrogen supply pipes 30, 32 and the hydrogen tanks 50, 52, respectively. The on-off valves 34, 36 are kept closed when not carrying out hydrogen charging, and are kept open when carrying out hydrogen charging. In a normal hydrogen charging process, the two on-off valves 34, 36 are opened and closed at the same time. That is, hydrogen charging is simultaneously performed in parallel with respect to the respective hydrogen tanks 50, 52. The on-off valves 34, 36 are opened or closed in response to a control signal being transmitted via the signal transmission structure of the hydrogen charging port 20 from the charge control unit of the hydrogen charging device 12. Note that the on-off valves 34, 36 may be omitted, depending on the structure of the hydrogen charging port 20.

Pressure gauges 38, 40 are pressure measuring means for measuring the charge pressure of the respective hydrogen tanks 50, 52. Being provided near the gas outlets/inlets of the respective hydrogen tanks 50, 52, the pressure gauges 38, 40 measure substantially the internal tank pressure of the respective hydrogen tanks 50, 52.

Thermometers 42, 44 are temperature measuring means for measuring the internal tank temperature of the respective hydrogen tanks 50, 52. The measured data of the pressure gauges 38, 40 and the measured data of the thermometers 42, 44 are sent via the signal transmission structure of the hydrogen charging port 20 to the charge control unit of the hydrogen charging device 12. Hydrogen gas charging is performed while monitoring the internal tank pressure and temperature of the respective hydrogen tanks 50, 52, using these signals.

When charging of hydrogen from the hydrogen charging port 20 is simultaneously performed in parallel, using the hydrogen tanks 50, 52 having different outside diameters, the internal tank pressure of the respective hydrogen tanks 50, 52 keeps increasing, while the same value is maintained between the two, as the charging proceeds. In addition, the internal tank temperature also increases.

The internal tank temperature increases as charging proceeds, as described above, because the hydrogen gas is depressurized in the channel from the hydrogen charging device 12 to the hydrogen tanks 50, 52, and accordingly heat is absorbed from outside air. For example, under the condition that the hydrogen charging device 12 expels high pressure hydrogen gas at room temperature, the internal tank temperature of the respective hydrogen tanks 50, 52 being charged increases to about 100° C.

An extent of increase of the internal tank temperature varies depending on a difference in the heat flux of the respective hydrogen tanks 50, 52. Heat flux is the magnitude of a heat flow amount per unit area, being an amount expressed as $W/cm^2$. In the case of a hydrogen tank, when the heat flux from the hydrogen gas charged in the hydrogen tank to the liner is large, a good heat discharging characteristic can be ensured. Thus, heat flux can be normally considered to indicate heat discharging characteristic. That is, having good heat discharging characteristic means having a larger heat flux value.

The value of heat flux varies depending on the shape of a hydrogen tank. As the surface area of a hydrogen tank is an area where heat flux flows, a larger surface area leads to better heat discharge characteristic. Relative comparison of heat discharging characteristics of hydrogen tanks can be made using a value obtained by dividing a surface area by a volume. That is, the larger the value of (surface area/volume), the larger the value of heat flux. In the example shown in FIGS. 1 and 2, the length of the hydrogen tank 50 is equal to that of the hydrogen tank 52 and the outside diameter of the hydrogen tank 50 is larger than that of the hydrogen tank 52. Therefore, under the condition that there is no difference other than that in shape, the heat flux of the larger hydrogen tank 50 has a value smaller than that of the smaller hydrogen tank 52. In other words, for ready understanding, the larger hydrogen tank 50 is inferior in heat discharging characteristic to the smaller hydrogen tank 52.

Figure 3:
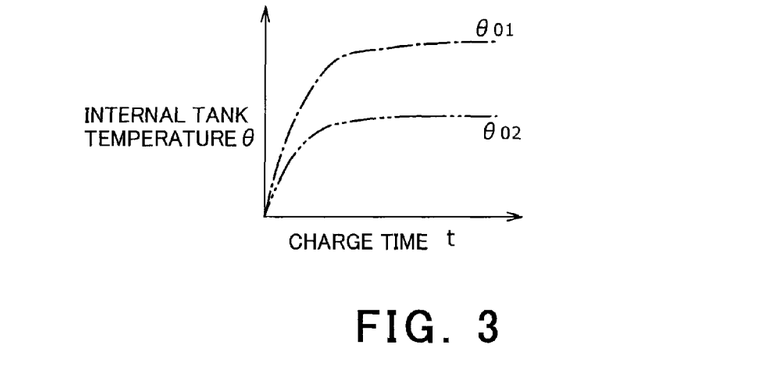
FIG. 3 is a diagram explaining increase of internal tank temperature in conventional hydrogen charging.

FIG. 3 is a diagram showing a relationship between a charge time t and the internal tank temperature of the respective hydrogen tanks 50, 52 when the two hydrogen tanks 50, 52 having different heat fluxes are simultaneously charged with hydrogen gas in parallel at the same charge pressure. As shown in FIG. 2, the internal tank temperature measured by the thermometer 42 of the hydrogen tank 50 is denoted as $\theta_1$, while that measured by the thermometer 44 of the hydrogen tank 52 is denoted as $\theta_2$. Note that, as FIG. 2 relates to a conventional art for comparison without a separating mechanism, the internal tank temperature of the hydrogen tank 50 is denoted as $\theta_{01}$ and that of the hydrogen tank 52 is denoted as $\theta_{02}$.

As shown in FIG. 3, while the internal tank temperature $\theta_{02}$ of the hydrogen tank 52 having a larger heat flux value does not increase very much because of the good heat discharging characteristic, the internal tank temperature $\theta_{01}$ of the hydrogen tank 50 having a smaller heat flux value increases remarkably.

As shown in FIG. 2, supposing that the internal tank pressure measured by the pressure gauge 38 of the hydrogen tank 50 is denoted as $P_1$ and that measured by the pressure gauge 40 of the hydrogen tank 52 as $P_2$, $P_1=P_2$ is held as hydrogen charging is simultaneously performed in parallel with respect to the hydrogen tanks 50, 52. When the internal tank pressures $P_1$, $P_2$ are the same while the internal tank temperatures $\theta_{01}$, $\theta_{02}$ are different from each other, the density of the hydrogen gas is consequently different between the hydrogen tanks 50, 52. That is, the charge rate differs between the hydrogen tanks 50, 52 even though the charge time is equal. As the internal tank pressure will not exceed the supply pressure from the hydrogen charging device 12, hydrogen charging will not proceed further when the internal tank pressure $P_1=P_2$ becomes equal to a pressure obtained by subtracting a pressure loss caused before reaching the hydrogen tank from the supply pressure at the hydrogen charging device 12.

When the state of charge is indicated by an SOC (State of Charge), like a charge rate when charging will no longer proceed, the SOC is consequently different in the same charge period between the hydrogen tanks 50, 52 having different shapes. Referring to the example in FIG. 2, the SOC of the larger hydrogen tank 50 having a smaller heat flux value becomes smaller than that of the smaller hydrogen tank 52 having a larger heat flux value. This difference in the SOC is expressed by the concentration of the diagonal lines drawn on the hydrogen tanks 50, 52 in FIG. 2. Note that the SOC value of 100% is a so-called fully charged state.

As described above, conventionally, simultaneous parallel performance of hydrogen charging with respect to hydrogen tanks results in different SOC's between the respective hydrogen tanks, depending on the heat flux values of the respective hydrogen tanks. When there is any hydrogen tank left not fully charged because of the different SOC's of the respective hydrogen tanks, the amount of hydrogen gas available to be used is reduced as a whole, as compared to a case when the SOC's of all hydrogen tanks are the same. In the case of the hydrogen tanks 50, 52 mounted on the electric vehicle 6, the distance over which the vehicle can run is reduced.

Figure 4:
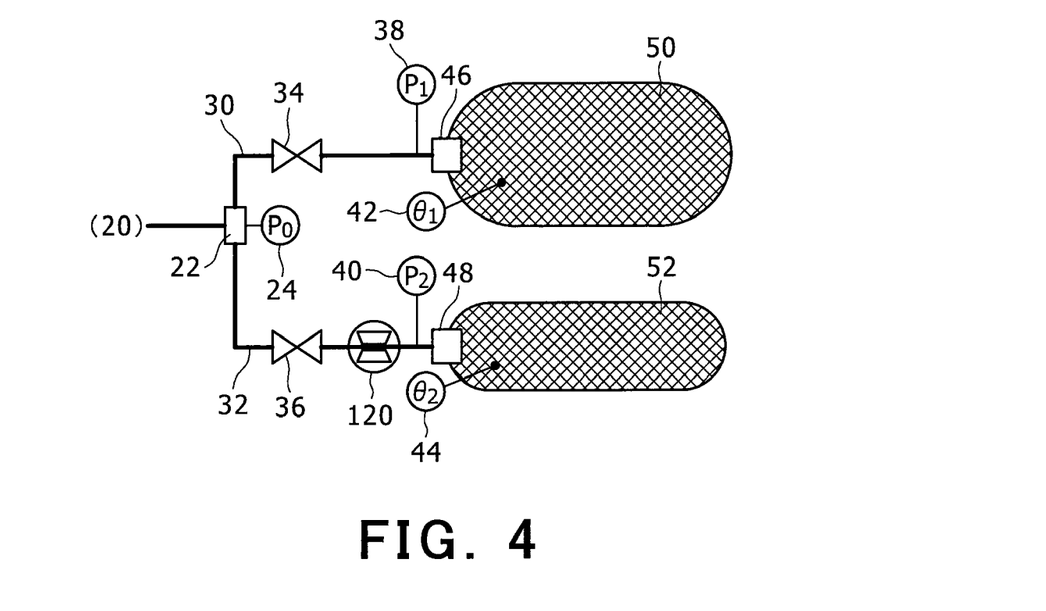
FIG. 4 is a diagram explaining provision of an orifice as a flow restrictor on the side of the hydrogen tank having larger heat flux in the system for hydrogen charging according to an embodiment of the present invention.

In the following, the hydrogen charging system 10 having a flow restrictor will be described in detail. FIG. 4 is a diagram corresponding to FIG. 2, and shows components, mounted in a vehicle, of the hydrogen charging system 10 having an orifice 120 as a flow restrictor. The difference from FIG. 2 is the orifice 120 provided between the hydrogen charging port 20 and the hydrogen tank 52 having a larger heat flux value.

The orifice 120 is a restricting device, as described above, specifically, for narrowing a hydrogen gas channel to thereby increase the channel resistance of the channel. The orifice 120 is provided only on the side of the hydrogen tank 52 having a larger heat flux value, but not on the side of the hydrogen tank 50 having a smaller heat flux value. Therefore, when hydrogen gas is supplied from the single hydrogen charging port 20 under the same condition, the channel resistance for the hydrogen gas flow on the side of the hydrogen tank 50 becomes smaller than that on the side of the hydrogen tank 52. Thus, most of the hydrogen gas initially flows into the hydrogen tank 50, and after the hydrogen tank 50 is fully charged to be no longer charged with hydrogen gas, the hydrogen tank 52 is then charged with hydrogen gas to the charge state identical to that of the hydrogen tank 50.

Figure 5:
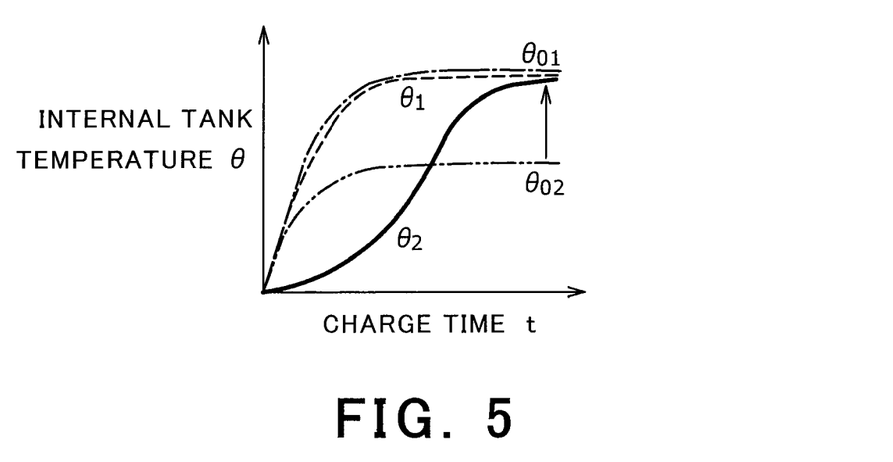
FIG. 5 is a diagram explaining increase of the internal tank temperature in the case shown in FIG. 4.

This is shown in FIG. 5 as a change in the internal tank temperature. FIG. 5 is a diagram corresponding to FIG. 3, in which the abscissa corresponds to a charge time t and the ordinate corresponds to the internal tank temperature θ. As shown in FIG. 5, as most of the hydrogen gas supplied from the hydrogen charging port 20 flows into the hydrogen tank 50 during an initial period of charging because of the difference in the channel resistance, the internal tank temperature $\theta_1$ of the hydrogen tank 50 increases with elapse of the charge time t. An extent of increase is substantially identical to that of $\theta_{01}$ described by reference to FIG. 3. As the hydrogen tank 50 comes to be in nearly the fully charged state of hydrogen gas, charging the hydrogen tank 50 with hydrogen gas becomes not easy. This is shown by saturation of the internal tank temperature $\theta_1$ as the charge time t becomes longer.

When charging the hydrogen tank 50 with hydrogen gas becomes not easy, relatively, charging the hydrogen tank 52 proceeds. This is shown by the low internal tank temperature $\theta_2$ of the hydrogen tank 52 during an initial period of charging and subsequent gradual increase of $\theta_2$ as the internal tank temperature $\theta_1$ of the hydrogen tank 50 comes to be saturated. The hydrogen tank 52 is gradually charged with hydrogen gas to a final extent, and accordingly, the SOC of the hydrogen tank 50 becomes equal to that of the hydrogen tank 52, and both of the hydrogen tanks 50, 51 are left in the fully charged state.

As described above, when an orifice is provided only on the side of the hydrogen tank 52 having a larger heat flux value, it is possible to initially have the hydrogen tank 50 having a smaller heat flux value in a fully charged state, and then the hydrogen tank 52 having a larger heat flux value in the fully charged state.

Figure 6:
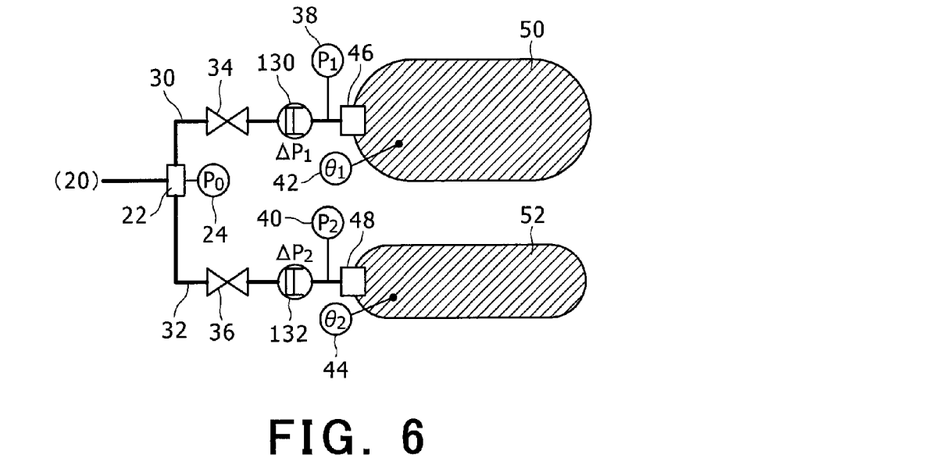
FIG. 6 is a diagram explaining provision of check valves having different cracking pressures as flow restrictors in the system for hydrogen charging according to an embodiment of the present invention.

FIG. 6 is a diagram explaining a case in which check valves having different cracking pressures are provided as flow restrictors midway along the respective channels from the hydrogen charging port 20 to the respective hydrogen tanks 50, 52. In the above, a check valve 132 having a cracking pressure $\Delta P_2$ is provided on the side of the hydrogen tank 52 having larger heat flux and a check valve 130 having a cracking pressure $\Delta P_1$ is provided on the side of the hydrogen tank 50 having smaller heat flux. The relationship between $\Delta P_1$ and $P_2$ is set as $\Delta P_2 > \Delta P_1$. That is, a pressure loss at the check valve 132 is larger than that at the check valve 130.

Supposing that the respective internal tank pressures of the hydrogen tanks 50, 52 with no check valves 130, 132 provided are denoted as $P_{01}$, $P_{02}$, respectively, $P_{01} = P_{02}$ is held as hydrogen gas is simultaneously supplied from the same hydrogen charging port 20 to the respective hydrogen tanks 50, 52 in parallel. When the check valves 130, 132 having the above described respective cracking pressures are provided, the internal tank pressure $P_1$ of the hydrogen tank 50 is denoted as $P_1 = P_{01} - \Delta P_1$ and the internal tank pressure $P_2$ of the hydrogen tank 52 is denoted as $P_2 = P_{02} - \Delta P_2$. In the above, as $\Delta P_2 > \Delta P_1$ is held, $P_1 > P_2$ consequently holds.

Figure 7:
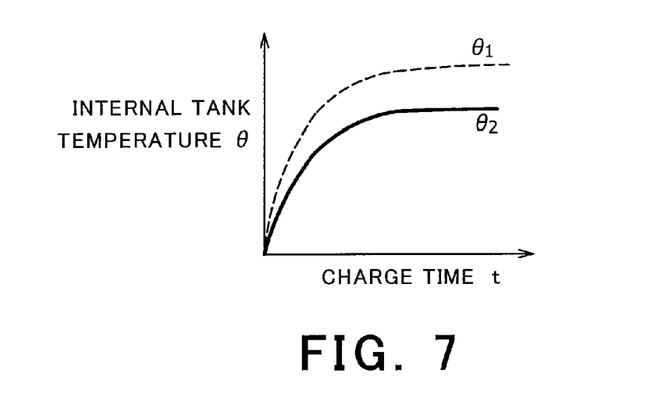
FIG. 7 is a diagram explaining increase of the internal tank temperature in the case shown in FIG. 6.
Figure 8:
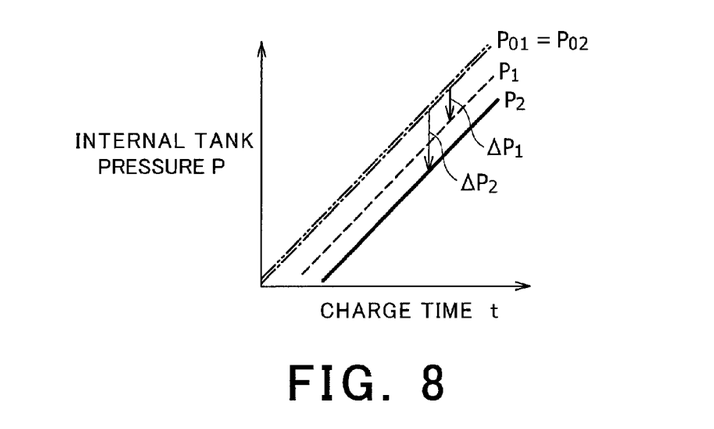
FIG. 8 is a diagram explaining increase of the internal tank pressure in the case shown in FIG. 6.

This is shown in FIGS. 7 and 8. FIG. 7 is a diagram corresponding to FIG. 3, in which the abscissa is a charge time t and the ordinate is the internal tank temperature θ. As the heat flux value of the hydrogen tank 50 is smaller than that of the hydrogen tank 52, the internal tank temperature $\theta_1$ of the hydrogen tank 50 is higher than the internal tank temperature $\theta_2$ of the hydrogen tank 52. Thus, when the internal tank pressure of the hydrogen tank 50 is equal to that of the hydrogen tank 52, similar to a case of the conventional art, the SOC of the hydrogen tank 50 becomes smaller than that of the hydrogen tank 52, as described by reference to FIG. 3.

FIG. 8 is a diagram showing the internal tank pressure P, in which the abscissa is a charge time t and the ordinate is the internal tank pressure P. As described above, as the internal tank pressure $P_1$ of the hydrogen tank 50 is expressed as $P_1 = P_{01} - \Delta P_1$, the internal tank pressure $P_2$ of the hydrogen tank 52 is expressed as $P_2 = P_{02} - \Delta P_2$. Note that as $P_{01} = P_{02}$ and $\Delta P_2 > \Delta P_1$ are held, $P_1 > P_2$ consequently holds. As described above, the structure shown in FIG. 6 can set different internal tank pressures between the hydrogen tanks 50 and 52 such that the internal tank pressure $P_2$ of the hydrogen tank 52 having larger heat flux is smaller than the internal tank pressure $P_1$ of the hydrogen tank 50 having smaller heat flux. With the above, it is possible to be close the SOC of the hydrogen tank 50 to the SOC of the hydrogen tank 52. Then, when $\Delta P_1$ and $\Delta P_2$ are set appropriately, it is possible to have the same SOC for the hydrogen tanks 50, 52, although the hydrogen tanks 50, 52 cannot be fully charged.

Figure 9:
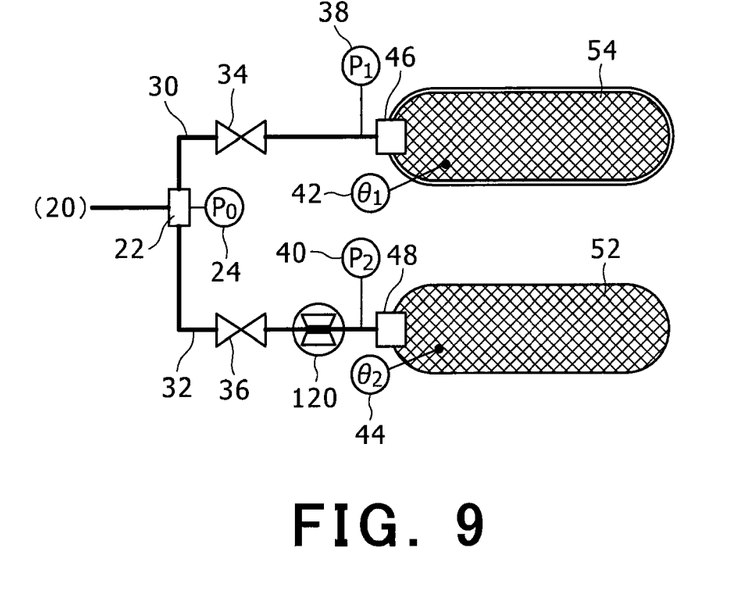
FIG. 9 is a diagram explaining a case in which two hydrogen tanks having structures different from those shown in FIG. 4 are used.

Note that the hydrogen tanks 50, 52 having different shapes are described in the above, the heat flux value will become different also when the material of the hydrogen tanks are different even though the shapes thereof are the same. FIG. 9 shows the hydrogen charging system 10 having the orifice 120 as a flow restrictor, in which the two hydrogen tanks 52, 54 have the same length and outside diameter but liners made of different materials. To make easier comparison with FIG. 4, it is determined here that the hydrogen tank 52 employs an aluminum liner, while the hydrogen tank 54 employs a resin liner. In FIG. 9, the hydrogen tank 54 is indicated by double lines for discrimination from the hydrogen tank 52.

In this case, the heat flux value of the hydrogen tank 54 is smaller than that of the hydrogen tank 52. The orifice 120 is provided only on the side of the hydrogen tank 52 having a larger heat flux value. Therefore, this structure as well can produce the same effect as that which has been described referring to FIGS. 4 and 5, ensuring the same SOC for both of the hydrogen tanks 52, 54 and fully charging the hydrogen tanks 52, 54.

Figure 10:
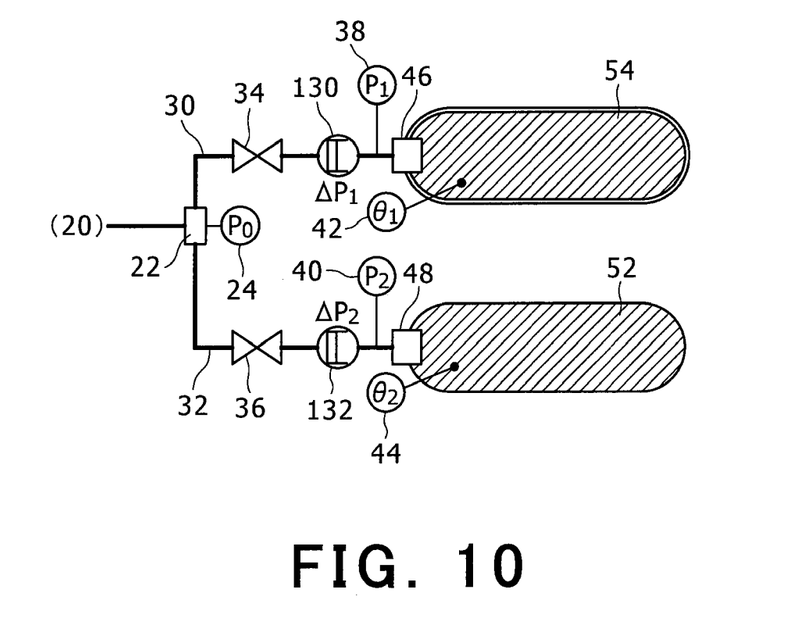
FIG. 10 is a diagram explaining a case in which two hydrogen tanks having different structures from those shown in FIG. 6 are used.

FIG. 10 relates to a case in which, in the hydrogen charging system 10 having check valves 130, 132 having different cracking pressures as flow restrictors, the two hydrogen tanks 52, 54 have the same length and outside diameter, but the hydrogen tank 52 has an aluminum liner, and the hydrogen tank 54 has a resin liner.

In this case as well, the heat flux value of the hydrogen tank 54 is smaller than that of the hydrogen tank 52. The check valve 130 having a cracking pressure $\Delta P_1$ is provided on the side of the hydrogen tank 54 having smaller heat flux, while the check valve 132 having a cracking pressure $\Delta P_2$ is provided on the side of the hydrogen tank 52 having larger heat flux. Thus, this structure as well can produce the same effect as that which has been described by reference to FIGS. 6 to 8, ensuring the same SOC for the hydrogen tanks 52, 54.

Figure 11:
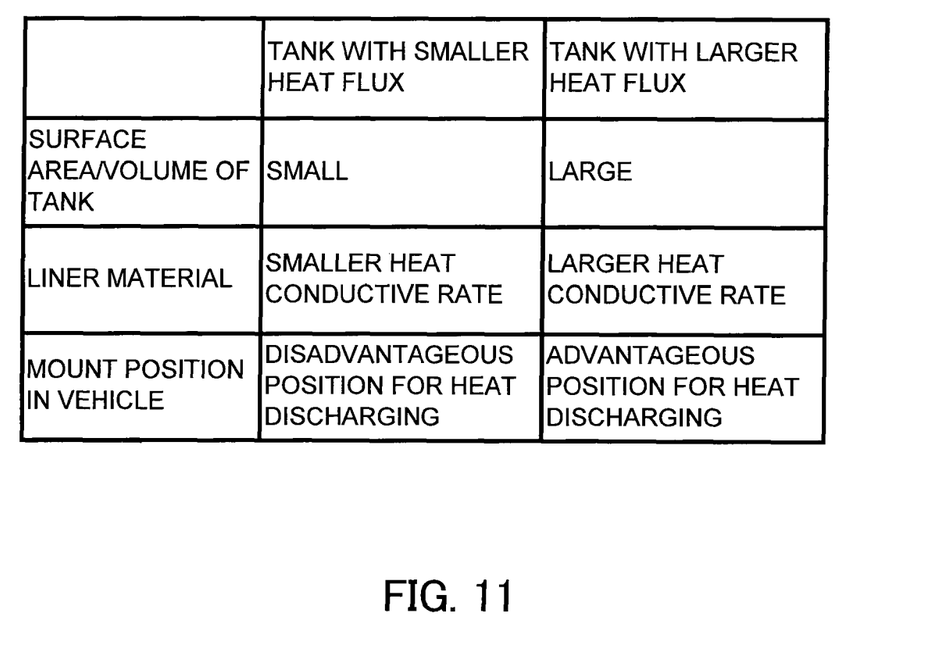
FIG. 11 is a diagram summarizing the details of tanks having different heat fluxes in the system for hydrogen charging according to an embodiment of the present invention.

FIG. 11 is a diagram summarizing details on hydrogen tanks having different heat flux values. The difference in the heat flux value is attributed to the difference in (surface area/volume) of the hydrogen tanks, as described by reference to FIGS. 2, 4, and 6. As summarized in FIG. 11, the larger the (surface area/volume), the larger the heat flux value. In addition, different materials of the hydrogen tanks also result in different heat flux values. As described by reference to FIGS. 9 and 10, for an aluminum liner and a resin liner, the former has a larger heat conductive rate and thus a larger heat flux value.

Even between a plurality of hydrogen tanks having the same shape and made of identical material, the values of heat fluxes from the hydrogen gas in the respective hydrogen tanks to the respective liners become different due to the positions on a vehicle where the hydrogen tanks are mounted. For example, for a hydrogen tank mounted in a position in a vehicle exposed to wind as the vehicle runs and a hydrogen tank mounted in a position in an airtight space, the former has better heat discharging characteristic and thus a larger heat flux value. As described above, as summarized in FIG. 11, a hydrogen tank mounted in a position advantageous in heat discharging has a larger heat flux value.

INDUSTRIAL APPLICABILITY

A system for hydrogen charging according to the present invention can be used as a system for charging a plurality of hydrogen tanks in parallel with hydrogen gas.

Description of Reference Numerals 4 hydrogen supply station, 6 electric vehicle, 8 hydrogen charging part, 10 system for hydrogen charging, 12 hydrogen charging device, 14 hydrogen supply tube, 20 hydrogen charging port, 22 branch, 24, 38, 40 pressure gauge, 30, 32 hydrogen supply pipe, 34, 36 on-off valve, 42, 44, 48 thermometer, 46, 48 plug, 50, 52, 54 hydrogen tank, 120 orifice, 130, 132 check valve.

The invention claimed is:

1. A system for hydrogen charging for charging a plurality of hydrogen tanks having different heat fluxes with hydrogen gas, the heat flux being a magnitude of a heat flow amount per unit area, comprising:
   supply channels for connecting a hydrogen charging device and the respective hydrogen tanks; and
   a flow restrictor for increasing a channel resistance of the supply channel connected to the hydrogen tank having larger heat flux to be larger than a channel resistance of the supply channel connected to the hydrogen tank having smaller heat flux or increasing a pressure loss of the supply channel connected to the hydrogen tank having larger heat flux to be larger than a pressure loss of the supply channel connected to the hydrogen tank having smaller heat flux.

2. The system for hydrogen charging according to claim 1, wherein the flow restrictor is an orifice restrictor provided to the supply channel connected to the hydrogen tank having larger heat flux.

3. The system for hydrogen charging according to claim 1, wherein
   the flow restrictor comprises check valves provided to the respective supply channels, and
   a cracking pressure of the check valve provided to the supply channel connected to the hydrogen tank having larger heat flux is higher than a cracking pressure of the check valve provided to the supply channel connected to the hydrogen tank having smaller heat flux.

4. The system for hydrogen charging according to claim 1, wherein
   the plurality of hydrogen tanks are fuel gas tanks mounted on a vehicle, and
   the hydrogen tank having larger heat flux is a tank having a larger surface area per unit volume, a tank made of material having a larger heat conductive rate, or a tank mounted on a vehicle in a position advantageous in ensuring larger heat flux, as compared to the hydrogen tank having smaller heat flux.

* * * * *